(12) United States Patent
Abe (10) Patent No.: US 7,773,110 B2
(45) Date of Patent: Aug. 10, 2010

(54) ELECTRONIC ENDOSCOPE APPARATUS

(75) Inventor: Kazunori Abe, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 1408 days.

(21) Appl. No.: 11/105,391

(22) Filed: Apr. 14, 2005

(65) Prior Publication Data

US 2005/0231591 A1 Oct. 20, 2005

(30) Foreign Application Priority Data

| Apr. 16, 2004 | (JP) | ............................. 2004-121003 |
| Apr. 19, 2004 | (JP) | ............................. 2004-122441 |

(51) Int. Cl.
*H04N 7/18* (2006.01)

(52) U.S. Cl. .......................................... 348/65; 348/61

(58) Field of Classification Search .................. 348/61, 348/65; 600/111, 109; 345/600
See application file for complete search history.

(56) References Cited

U.S. PATENT DOCUMENTS

| 5,790,096 | A | * | 8/1998 | Hill, Jr. ....................... 345/600 |
| 6,275,267 | B1 | | 8/2001 | Kobayashi |
| 6,402,685 | B1 | * | 6/2002 | Igarashi ...................... 600/111 |
| 6,515,679 | B1 | | 2/2003 | Igarashi |
| 2003/0169247 | A1 | | 9/2003 | Kawabe et al. |
| 2004/0133072 | A1 | * | 7/2004 | Kennedy .................... 600/109 |

FOREIGN PATENT DOCUMENTS

| JP | 4-253830 | 9/1992 |
| JP | 4-253830 A | 9/1992 |
| JP | 7-298202 | 11/1995 |
| JP | 10-286232 | 10/1998 |
| JP | 10-328145 | 12/1998 |
| JP | 2000-115591 | 4/2000 |
| JP | 2000-287203 A | 10/2000 |
| JP | 2001-157665 | 6/2001 |
| JP | 2001-215419 | 8/2001 |
| JP | 2002-224026 | 8/2002 |
| JP | 2003-24272 | 1/2003 |
| JP | 2003-32529 | 1/2003 |
| JP | 2003-333454 | 11/2003 |
| JP | 2004-335 | 1/2004 |
| JP | 2004-73671 | 3/2004 |

OTHER PUBLICATIONS

Office Action dated Jun. 13, 2008, issued on U.S. Appl. No. 11/038,409.

* cited by examiner

*Primary Examiner*—Allen Wong
(74) *Attorney, Agent, or Firm*—Birch, Stewart, Kolasch & Birch, LLP (57) ABSTRACT

An electronic endoscope apparatus comprises: a processor unit; and an electronic endoscope having a solid-state pickup element, the electronic endoscopes being capable of connecting to the processor unit, so as to generate digital picture signals, wherein the processor unit comprises a differential signal outputting portion that generates digital picture signals corresponding to a pixel number of the solid-state pickup element and corresponding to a display standard for an external computer, parallel-serially converts the digital picture signals, and outputs the converted signals as differential signals, and wherein the electronic endoscope apparatus further comprises a high-definition television system converter that detects the pixel number of the digital picture signals based on the differential signals, converts the digital picture signals to high-definition television signals based on the detected number of pixels and outputs the high-definition television signals, the high-definition television system converter being detachably connected to the differential signal outputting portion.

5 Claims, 11 Drawing Sheets

ELECTRONIC ENDOSCOPE APPARATUS

RELATED APPLICATIONS

This application claims the priority of Japanese Patent Application Nos. filed on Apr. 16, 2004 and Apr. 19, 2004, respectively, which are incorporated herein by reference.

BACKGROUND OF THE INVENTION

1. Field of the Invention

The present invention relates to a configuration of an electronic endoscope apparatus capable of outputting pictures of an object to be picked up, into a high-definition television system monitor particularly in an environment where various types of electronic endoscopes having different numbers of pixels of a solid-state pickup element can be used.

2. Description of the Related Art

An electronic endoscope apparatus has a CCD (Charge Coupled Device), etc., which is a solid-state pickup element, incorporated at a distal end of an electronic endoscope (electroscope), and the CCD picks up an object to be picked up, on the basis of illumination brought about by a light source unit. And, picked-up signals obtained by the CCD of the electronic endoscope are outputted to a processor unit, wherein the picked-up signals are subjected to a picture process by the processor unit, pictures of the object to be picked up are displayed on a display monitor, and still pictures are recorded in a recording unit.

Generally, it is in an attempt that, although pictures of the object to be picked up in a display monitor of the NTSC system (the aspect ratio 3:4) which is the standard television system, the pictures are displayed in a display monitor of a high-definition (HDTV) system (the number of scanning lines of which is increased to be approximately double) of higher grade (the aspect ratio 9:16) as shown in, for example, Japanese Published Unexamined Patent Application No. H4-253830. Since, in an electronic endoscope apparatus, normal NTSC system signals (analog signals) are generated from output signals of a CCD, the NTSC signals are converted to high-definition signals.

On the other hand, still pictures (digital signals) of an object to be picked up, which are obtained by an electronic endoscope apparatus, are recorded in a video recording unit and a filing apparatus (recording medium) based on a personal computer, etc. Thereafter, the still pictures are displayed in a television monitor and a personal computer monitor for observation. A CCD based on a higher number of pixels, which can bring about high-resolution power, has been employed.

As described above, since the CCD which is a solid-state pickup element has recently been upgraded in resolution power and pixel number, in picture display based on the high-definition television system, there is an advantage in that it is impossible to observe an object to be picked up, the image quality of which has been improved in comparison with prior arts, even in picture display based on the high-definition television system. However, as described above, in the case of converting NTSC signals to high-definition television signals, the high-definition television signals are restricted by the resolution power of the NTSC picture signals, wherein there is a problem in that the CCD resolution power upgraded in quality cannot be sufficiently utilized.

In addition, since CCDs having different pixel numbers are incorporated, as described above, in an electronic endoscope, it is useless or wasteful in terms of costs that converting circuits to high-definition television signals are disposed, or renewed (or replaced) in a processor unit in response to differences in the CCD pixel number and change in upgrading the pixel number, and the apparatus becomes expensive.

Further, as regards equipment used in medical fields, strict standards are requested in regard to EMC (Electro-Magnetic Compatibility) and electrical safety, and it is unrealistic that the above-described medical standards are satisfied in large equipment such as a personal computer in order to convert signals to high-definition television signals.

Also, when converting pictures obtained by an electronic endoscope apparatus to the high-definition television system and observing the same, it is requested that the pictures are video-recorded and stored in a high-definition television recording unit. In this case, it becomes necessary to transmit control signals (commencement and stop of vide-recording and storing etc.) from an electronic endoscope side to a recording unit. Moreover, intransmission of control signals for recording, it is requested that the transmission system is composed of as few a number of transmission lines as possible in view of simplification of the structure and electrical safety.

SUMMARY OF THE INVENTION

The present invention was developed in view of the above situations. It is therefore an object of the invention to provide an electronic endoscope apparatus capable of acquiring high-definition television pictures with a simple structure and at low costs without lowering the resolution power even in a case of connecting an electronic endoscope having solid-state pickup elements of different pixel numbers incorporated therein by utilizing digitally-processed picture output to supply the same to a personal computer, etc. In addition, it is another object of the invention to provide an electronic endoscope apparatus capable of simplifying a transmission structure of control signals to a recording unit in a case of video-recording and storing high-definition television pictures.

In order to achieve the above-described object, according to the first aspect of the invention, there is provided an electronic endoscope apparatus comprising: a processor unit; and an electronic endoscope selected from various types of electronic endoscopes having different pixel numbers of a solid-state pickup element which pick up an object, each of the various types of electronic endoscopes being capable of interchangeably connecting to the processor unit, so as to generate digital picture signals, wherein the processor unit comprises a differential signal outputting portion that generates digital picture signals corresponding to a pixel number of the solid-state pickup element of the selected one of the various types of electronic endoscopes and corresponding to a display standard for an external computer, parallel-serially converts the digital picture signals, and outputs the converted signals as differential signals, and wherein the electronic endoscope apparatus further comprises a high-definition television system converter that detects the pixel number of the digital picture signals based on the differential signals inputted from the differential signal outputting portion, converts the digital picture signals to high-definition television signals based on the detected pixel number and outputs the high-definition television signals, the high-definition television system converter being detachably connected to the differential signal outputting portion.

According to the second aspect of the invention, there is provided the electronic endoscope apparatus, wherein the high-definition television system converter comprises an electronic enlarging circuit that electronically enlarges a picture image, so as to generate high-definition television signals of an optionally enlarged picture image.

According to third aspect of the invention, there is provided the electronic endoscope apparatus, wherein the differential signal outputting portion and high-definition television system converter are connected with a differential circuit comprising one of a pulse transformer and a capacitor to maintain a predetermined proof pressure.

According to fourth aspect of invention, there is provided the electronic endoscope apparatus as set forth in the first aspect of the invention, which records the digital picture signals in an external recording unit, the apparatus further comprising: a record controlling signal transmission structure that parallel-serially converts record/control signals of the digital picture signals for the external recording unit, then serially transmit the record/control signals from the differential signal outputting portion to the high-definition television system converter, and output the record/control signals from a control terminal disposed in the high-definition television system converter.

According to fifth aspect of the invention, there is provided the electronic endoscope apparatus, wherein, in the differential signal outputting portion, the record controlling signal transmission structure parallel-serially convert the record/control signals based on control of a microcomputer, encodes the record/control signals along with control signals pertaining to the digital picture signals, outputs the serial record/control signals as differential signals, and wherein, in the high-definition television system converter, the record controlling signal transmission structure decodes the record/control signals and serial-parallelly converts record/control signals.

According to such a composition as described above, since there are CCDs each being a solid-state pickup element, which have various types of pixel numbers, digital picture signals are generated in the differential signal outputting portion (for example, DVI) for outputting to a personal computer in accordance with standards such as VGA (Video Graphics Array) which has 640 pixels in the horizontal direction and 480 pixels in the vertical direction, XGA (extended Graphics Array) which has 1024 pixels in the horizontal direction and 768 pixels in the vertical direction, and SXGA (Super XGA) which has 1280 pixels in the horizontal direction and 960 or 1024 pixels in the vertical direction. After the picture signals are parallel-serially converted, the signals are outputted to a personal computer display monitor as differential signals. When the digital picture signals being the differential signals are supplied to a high-definition television system converter, the pixel number of the picture signals is detected, and high-definition television signals are generated in response to the pixel number. That is, high-definition television signals can be obtained while utilizing all the pixel information of the CCDs. Therefore, only by connecting the high-definition television system converter to a processor unit, it is possible to observe a picture image (moving image or still image) of an object to be observed, in a high-definition television display monitor. In addition, the picture images can be recorded in a high-definition television recording unit.

According to the second aspect of the invention, after a picture image inputted by the differential signal outputting portion is enlarged at an optional magnification by an electronic enlarging circuit, and the picture image is converted to high-definition television signals, a picture image (moving image or still image) of an object to be observed is displayed in a high-definition television display monitor at an easy-to-observe size.

Also, although there is a differential circuit in which a pulse transformer and a capacitor are employed as an input/output (transmission) circuit of the differential signals, if the proof pressure of the pulse transformer and capacitor is set to, for example, 4 kV or more, which is required for an electronic endoscope, in the invention according to the third aspect, it is possible to easily and electrically separate the high-definition television system converter side (power source) from the electronic endoscope (differential signal outputting portion) side.

And, for example, if a video-recording/storing switch of an electronic endoscope operation portion is operated, a record operating signal outputted from a microcomputer is serially transmitted from the differential signal outputting portion to a microcomputer of the high-definition television system converter, whereby the high-definition television pictures are recorded in a recording unit. Herein, in the case of the sixth aspect of the invention, in encoding control of digital control signals supplied along with digital picture signals, remaining codes other than reservation codes of default, and a record controlling signal is allotted to the codes. Therefore, the record controlling signal is transmitted to the high-definition system converter as a serial signal through a transmission line to output digital picture signals of the differential signal outputting portion of DVI, etc., wherein there is no need to provide a transmission line exclusive for a record controlling signal in the serial transmission line.

DETAILED DESCRIPTION OF THE INVENTION

First Embodiment

Figure 1:
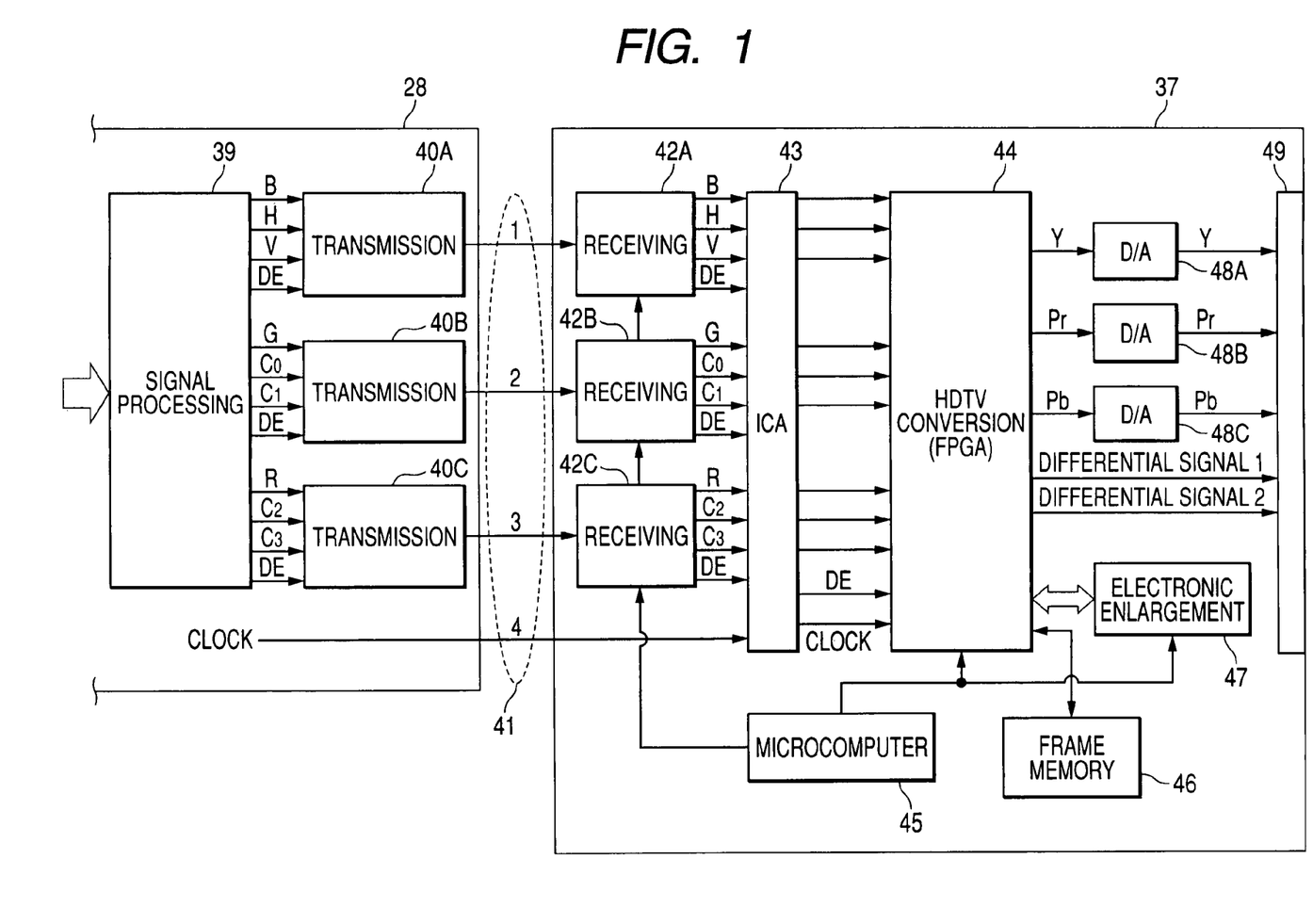
FIG. 1 is a circuit block diagram showing a configuration of a DVI circuit and a high-definition television system converter of an electronic endoscope apparatus according to the first embodiment of the invention.
Figure 2:
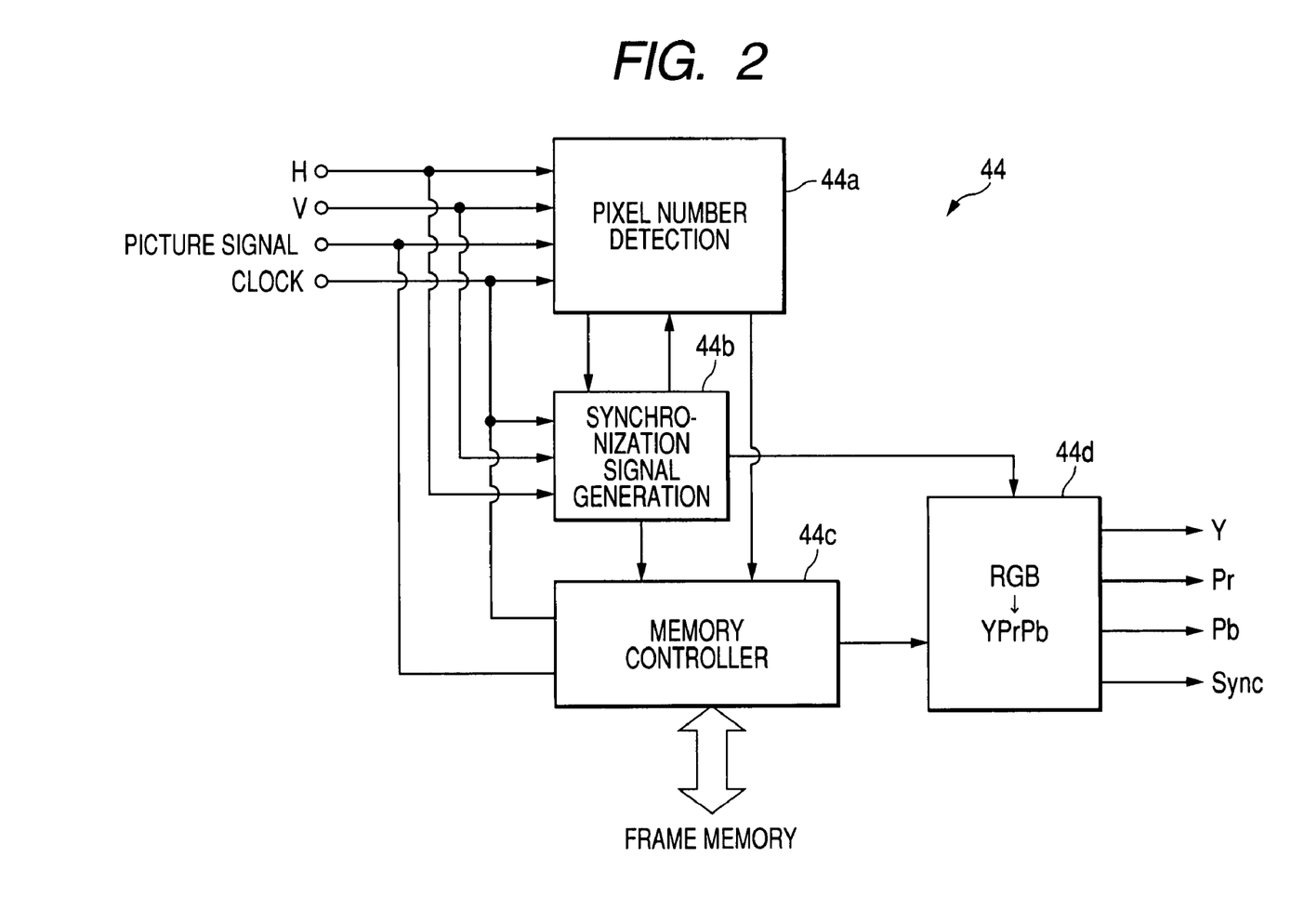
FIG. 2 is a view showing a configuration of the HDTV signal converting portion in the high-definition television system converter in the first and second embodiments.
Figure 3:
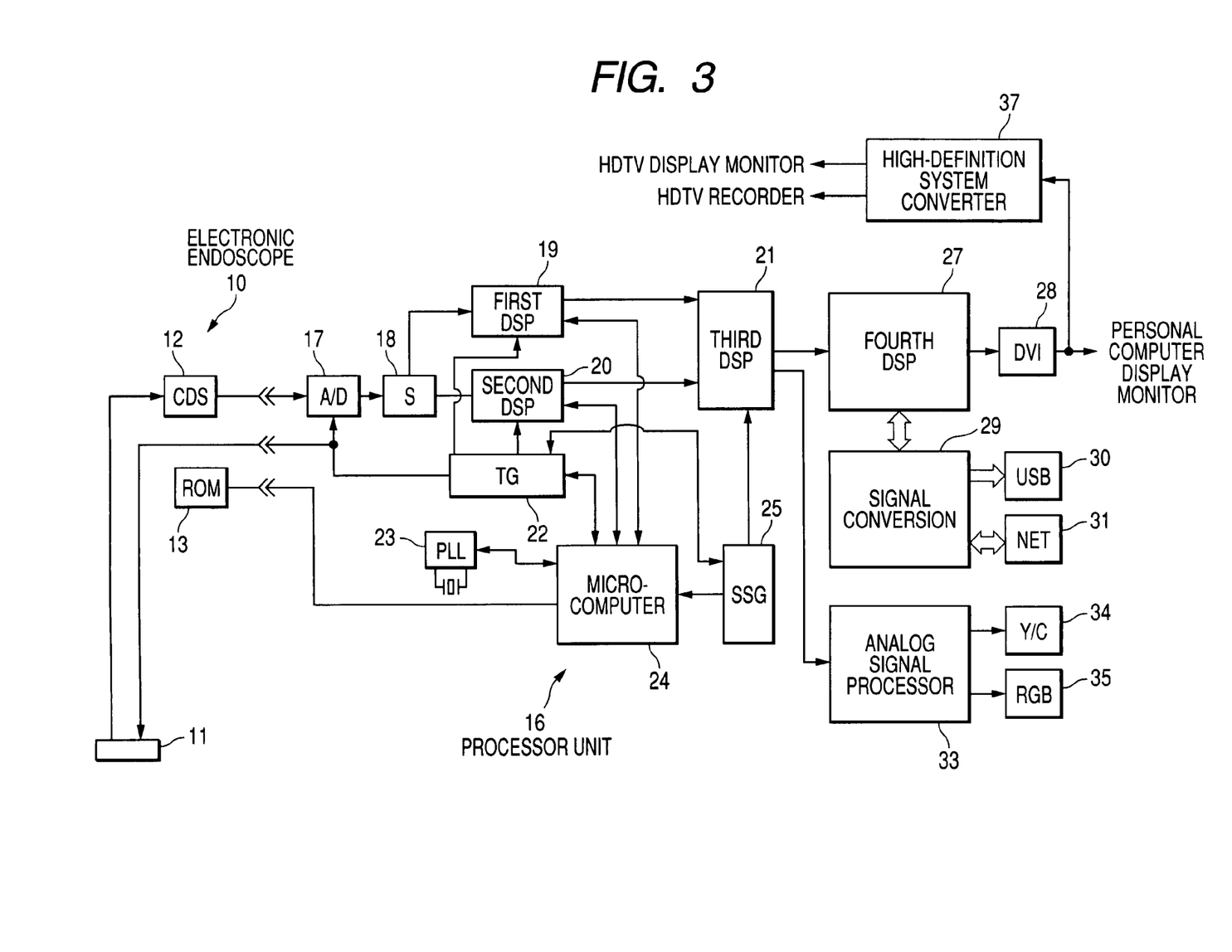
FIG. 3 is a block diagram showing a general configuration of an electronic endoscope apparatus according to the first embodiment.

FIG. 1 through FIG. 3 show a configuration of an electronic endoscope apparatus according to a first embodiment. A description is given of a general configuration thereof with reference to FIG. 3. In FIG. 3, a CCD 11 which is a solid-state pickup element is provided at a distal end of an electronic endoscope (Electroscope) 10. Various types of CCDs, for example, 400000-pixel type, 800000-pixel type, and 1300000-pixel type are incorporated as the CCD 11. Also, a correlation doubling sampling (CDS) circuit 12 for sampling picked up signals outputted from the CCD 11 and a memory (EEPROM) 13 for storing identification information and picture processing information of the electronic endoscope 10 are provided therein. Also, light of a light source device (not illustrated) is supplied to the electronic endoscope 10 via a light guide, and by outputting illumination light through the distal end, an object to be observed is picked up by the CCD 11. And, various types of electronic endoscopes 10 having different CCD 11 of the above-described pixel numbers (or different CCD transfer system corresponding to the pixel numbers) can be detachably connected to the processor unit 16.

And, a high-definition television system converter 37 is provided in a state where it is detachably connected to the output portion (terminal) of the DVI circuit 28, and output of the high-definition television system converter 37 is connected to an HDTV display monitor and an HDTV recorder. In addition, such a configuration may be employed, in which a part described as a circuit in the processor unit 16 in the configuration shown in FIG. 3 is disposed at the electronic endoscope apparatus 10 side.

FIG. 1 shows a detailed configuration of the interior of the DVI circuit 28 and high-definition television system converter 37. In the DVI circuit 28 are provided the signal processing portion 39 for generating pictures in the respective display standards, and transmission portions (encoder/serializer) 40A, 40B and 40C for converting parallel signals such as RGB signals, synchronization signals (H, V) and control signals ($C_0$ through $C_3$), which are outputted from the signal processing portion 39, to serial signals and carrying out encoding. The DVI circuit 28 is connected to the high-definition television system converter 37 via a serial transmission cable 41, and the high-definition television system converter 37 is provided with receiving portions (recovery/decoder) 42A, 42B and 42C for decoding receiving signals corresponding to the above-described three transmission portions 40A, 40B and 40C and for converting the serial signals to parallel signals.

Also, the high-definition television system converter 37 is provided with an ICA (Inter Channel Alignment) portion 43, an HDTV (High-definition television) signal converting portion (FPGA-Filed Programmable Gate Array Circuit) 44 for generating high-definition television signals by detecting the pixel number of pictures, a microcomputer 45 for carrying out various types of control, and a frame memory 46 for provisionally storing inputted picture signals. An electronic enlarging circuit 47 is connected to the HDTV signal converting portion 44, and D/A converters 48A, 48B and 48C are provided between the same and the connector 49, corresponding to Pr and Pb signals which are a brightness (Y) signal and a differential color signal.

FIG. 2 shows a configuration of the interior of the HDTV signal converting portion 44. The HDTV signal converting portion 44 is provided with a pixel number detecting circuit 44a for detecting the pixel number of picture signals by inputting a horizontal synchronization signal (H), a vertical synchronization signal (V), a picture signal and a clock signal, a synchronization signal generating circuit 44b for generating a high-definition television picture image, a memory controller 44c for controlling reading and writing of the picture signal with respect to the frame memory 46, and a signal converter 44d for converting RGB signals, which are outputted from the memory controller 44c, to Y, Pr, Pb signals being a high-definition television picture image.

Second Embodiment

Figure 10:
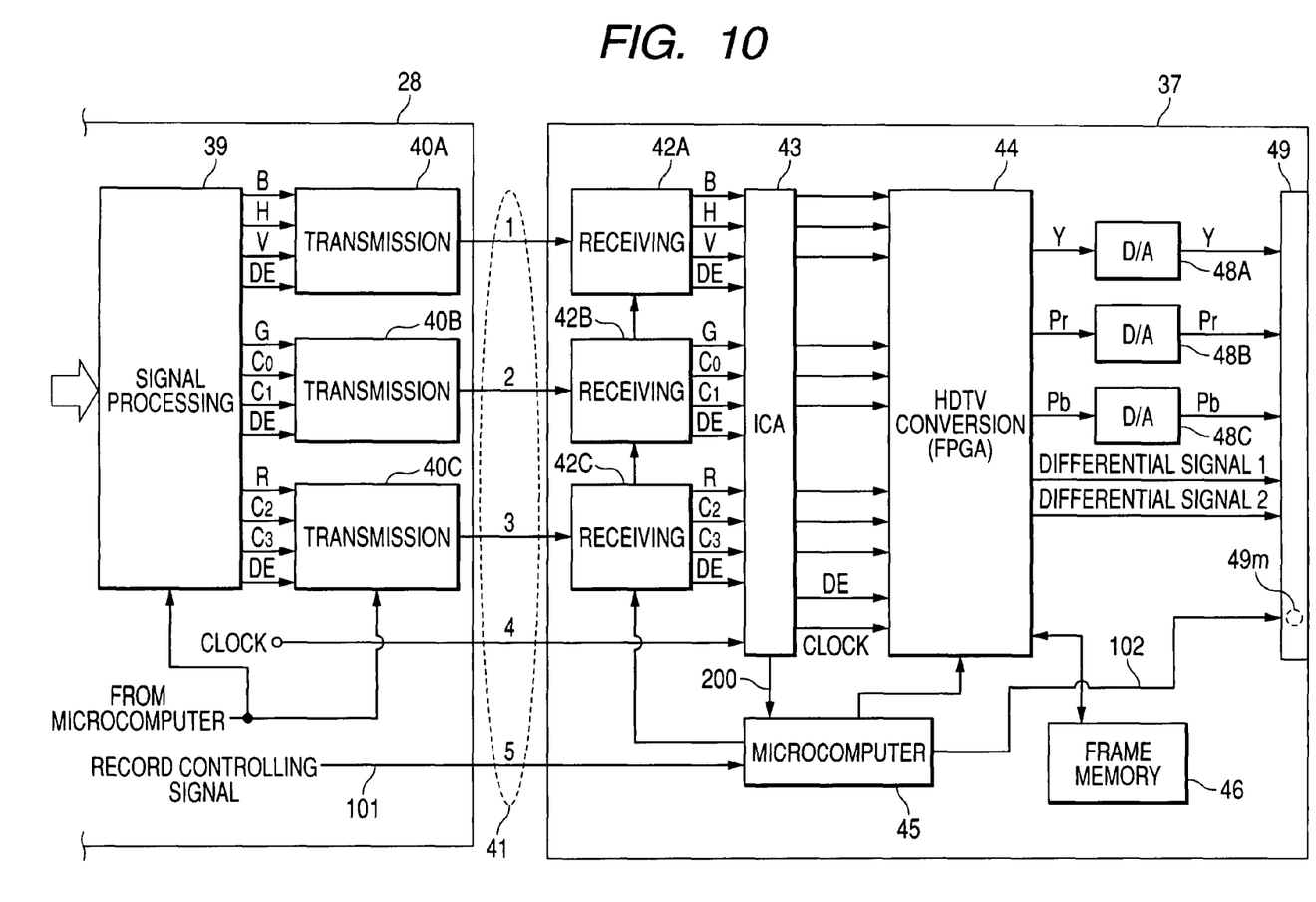
FIG. 10 is a circuit block diagram showing a DVI circuit of an electronic endoscope apparatus according to a second embodiment of the invention and showing a configuration of a high-definition television converter.
Figure 11:
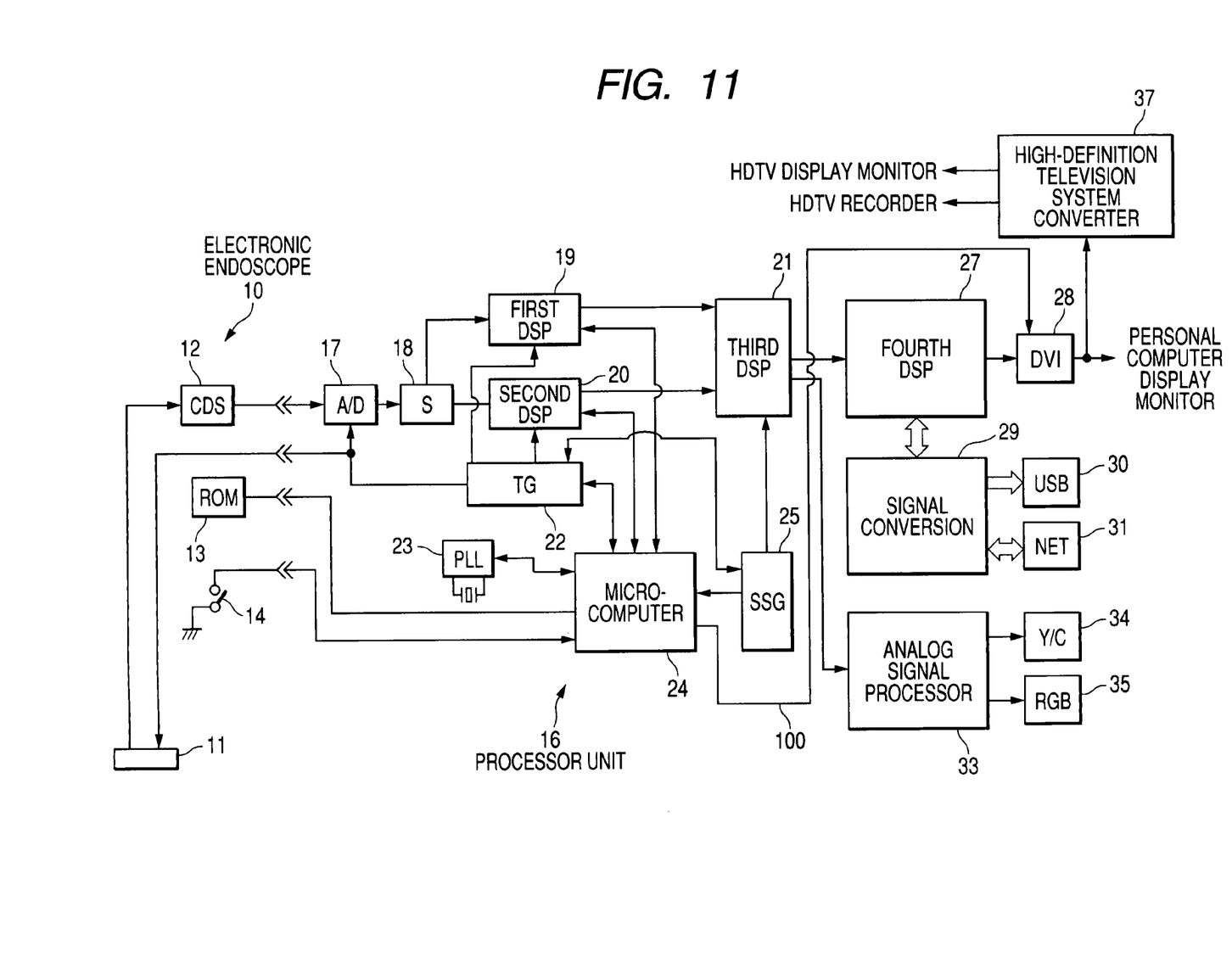
FIG. 11 is a circuit block diagram showing a general configuration of an electronic endoscope apparatus according to the second embodiment.

FIG. 2, FIG. 10 and FIG. 11 show configurations of an electronic endoscope apparatus according to the second embodiment. In the second embodiment, parts identical with those previously described with reference to the foregoing figures are denoted by the same or corresponding reference numerals in the corresponding figure and will not be discussed again.

In the second embodiment, as shown in FIG. 11 indicating a general configuration thereof, a video recording/storing switch 14 is provided at the operation portion (or the operation portion of a processor unit 16) of the electronic endoscope 10, and it is possible to record endoscopic (analog or digital) pictures in a recording unit (HDTV recorder) and a filing apparatus, which is an external device) by using the video recording/storing switch 14.

Record controlling signals outputted from the above-described video recording/storing switch 14 are supplied from the microcomputer 24 to the DVI circuit 28 as in the signal line 100, and are further outputted from the DVI circuit 28 to the above-described HDTV recorder via the high-definition television system converter 37.

FIG. 10 shows a detailed configuration of the interior of the DVI circuit 28 and high-definition television system converter 37. A connection terminal to a recording unit including control terminals 49m to a display monitor and an HDTV recorder is disposed at the connector 49.

Also, as the first example of the record controlling signal transmission structure, a transmission line 101 of record controlling signals, which is connected to a transmission line 100 in FIG. 11, is disposed in the DVI circuit 28, serial transmission cable 41 and high-definition television system converter 37, and the transmission line 101 is connected from the microcomputer 45 of the high-definition television system converter 37 to the control terminal 49m of the HDTV recorder in the connector 49 via the transmission line 102.

The first and second embodiments are composed as described above. A description is given of the actions thereof with reference to FIG. 4 to FIG. 6. First, in the electronic endoscope apparatus, the interior of an object to be observed is picked up by the CCD 11 in FIG. 3 and FIG. 11, and the picked up signals are sampled by the CDS circuit 12 and are converted to digital signals by the A/D converter 17. After that, the digital signals are supplied to the selector 18. In the selector 18, either of the first DSP 19 and the second DSP 20 is selected in accordance with the type of a connected electronic endoscope 10. For example, since the microcomputer 24 reads information in the memory 13 by communications between the electronic endoscope 10 and the processor unit 16, the first DSP 19 (in the case of interline scanning) or the second DSP 20 (in the case of progressive scanning) is selected in accordance with the pixel number of the CCD 11 (or the transfer system of CCD responsive to the pixel number).

Various types of picture processes are carried out in the first DSP 19 or the second DSP 20 and the third DSP 21. Output of the third DSP 21 is supplied to the fourth DSP 27 and analog signal processor 33. In the fourth DSP 27, picture signals for digital output are generated, and the picture signals are outputted externally via the signal converting circuit 29, USB outputting portion 30 and NET outputting portion 31, and simultaneously can be outputted to a personal computer display monitor, etc., via the DVI circuit 28. On the other hand, picture signals for analog output are generated in the above-described analog signal processor 33. Y signals and C signals are outputted through the Y/C signal outputting portion 34, and at the same time, respective color signals of R, G and B are outputted through the RGB outputting portion 35.

On the other hand, when output of the DVI circuit 28 is supplied to the high-definition television system television converter 37, high-definition television signals are generated in the high-definition television system converter 37. That is, picture signals of a display standard such as, for example, 640×480 (VGA), 1024×768 (XGA), 1280×960 or 1280×10$^{24}$ (SXGA), etc., corresponding to the pixel number of the CCD 11 are generated by the signal processing portion 39 of the DVI circuit 28 shown in FIG. 1 and FIG. 10. And, parallel signals [B (Blue), G (Green), R (Red), H (Horizontal synchronization signal), V (Vertical synchronization signal), $C_0$, $C_1$, $C_2$, $C_3$ (Control signals), etc.] which are outputted from the signal processing portion 39 are encoded by the transmission portions 40A through 40C, and simultaneously are converted to serial signals. Then, the serial signals are outputted to the high-definition television system converter 37 via the serial transmission cable 41. As shown in FIG. 1 and FIG. 10, the B signal and H, V signals which are transmitted from the transmission portion 40A are received by the receiving portion 42A, the G signal and other signals, which are transmitted from the transmission portion 40B, are received by the receiving portion 42B, and the R signal and other signals, which are transmitted from the transmission portion 40C are received by the receiving portion 42C. In these receiving portions 42A through 42C, the received signals are decoded, and simultaneously are converted to parallel signals. The parallel signals are supplied to the HDTV signal converting portion (FPGA) 44 via the ICA circuit 43.

Figure 4A:
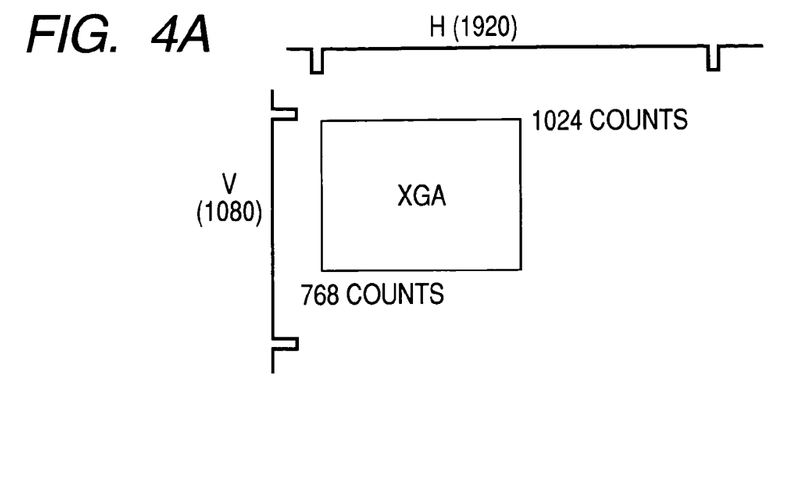
FIG. 4A shows detection of pixel numbers of the XGA standard picture signals, which is carried out in a high-definition television system converter according to the embodiment.
Figure 5A:
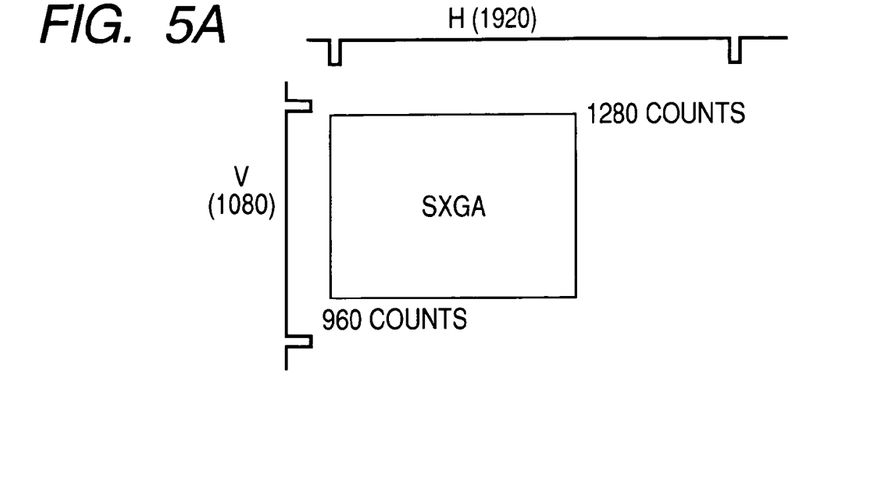
FIG. 5A is descriptive view showing detection of the pixel number of picture signals whose pixels are 1280×960, which is carried out in a high-definition television system converter according to the embodiment.

As soon as, in the HDTV signal converting portion 44, the inputted picture signals are stored in the frame memory 46 via the memory controller 44c in FIG. 2, the pixel number of the inputted picture signals is detected by the pixel number detecting circuit 44a using the horizontal synchronization signal and vertical synchronization signal. That is, as shown in FIG. 4A and FIG. 5A, the horizontal synchronization signal (H) of the high-definition television system is equivalent to 1920 pixels, and the vertical synchronization signal (V) is equivalent to 1080 pixels. However, for example, when 1024 horizontal pixels are detected (counted) by the horizontal synchronization signal of the picture signals inputted into the converter 37, or when 768 vertical pixels are detected by the vertical synchronization signal, it is determined that the picture signal is an XGA picture (or image) whose pixels are 1024×768. Similarly, when 1280 horizontal pixels or 960 vertical pixels are detected, it is determined that the picture signal is a picture image whose pixels are 1280×960. When 640 horizontal elements or 480 vertical pixels are detected, it is determined that the picture signal is a VGA standard picture image whose pixels are 640×480. When 1280 horizontal pixels or 1024 vertical pixels are detected, it is determined that the picture image is an SXGA picture image whose pixels are 1280×1024. And, since detection results of the pixel numbers are supplied into the synchronization signal generating circuit 44b and memory controller 44c, the memory controller 44c carries out reading control of picture signals from the frame memory 46 in accordance with the pixel numbers.

Figure 4B:
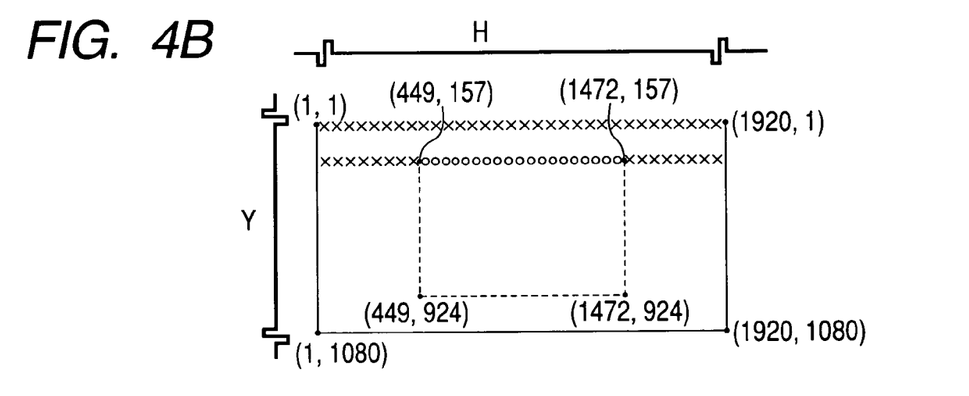
FIGS. 4B and 4C are descriptive views showing conversion to high-definition television signals and display states thereof.
Figure 4C:
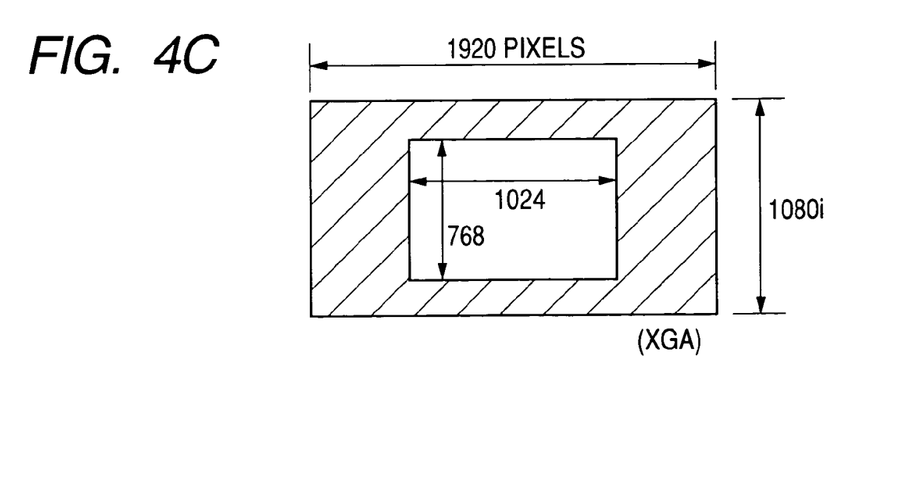

For example in the case of the image whose pixels are 1024×768, as shown in FIG. 4B, black is allotted to all the horizontal pixels from 1 to 156 in the vertical direction, and the above-described XGA picture signals are allotted to the 449th through 1472nd pixels in the horizontal direction with respect to the 157th line in the vertical direction, whereby picture signals (RGB signals) in a range surrounded by pixels (449, 157), (1472, 157), (449, 924), and (1472, 924) are read out. Black is allotted to the other pixels. And, the RGB signals are converted to Y, Pr, and Pb signals in the signal converter 44d. The Y, Pr, Pb signals and synchronization signals are outputted to an HDTV display monitor and an HDTV recorder. Thus, as shown in FIG. 4C, a high-definition television picture in which a picture image of an object to be observed, having pixels of 1024×768, is disposed in the center area, that is, a picture image (format $D_4$) having pixels of 1920×1080i (Interlace) is displayed in the HDTV display monitor.

Figure 5B:
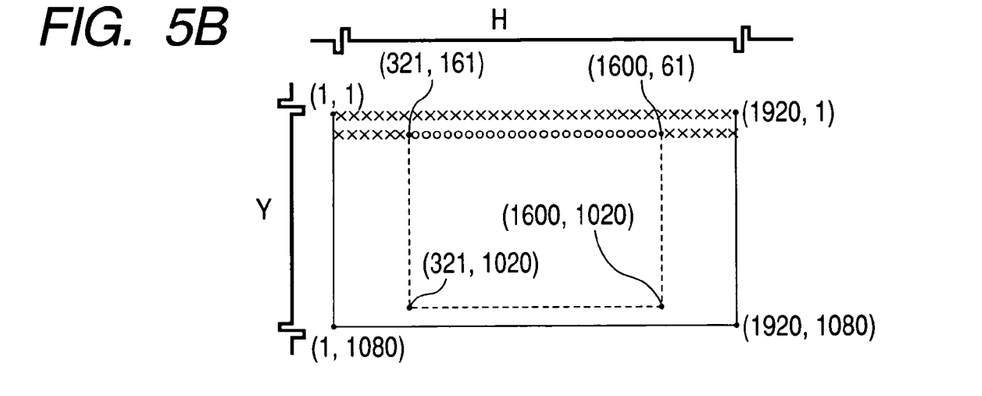
FIG. 5B and FIG. 5C are descriptive views showing conversion to high-definition television signals and display status thereof.
Figure 5C:
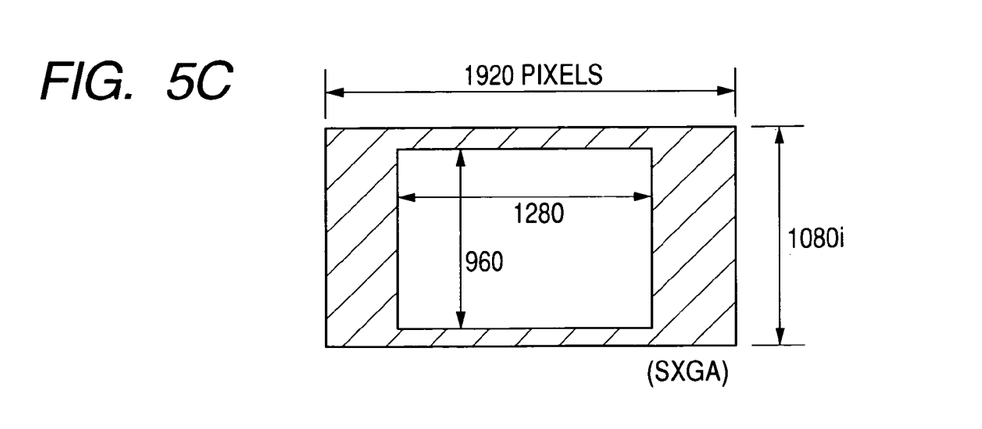

For example, in the case where a picture is of 1280×960 pixels, as shown in FIG. 5B, black color is allotted to all the horizontal pixels from 1 through 60 in the vertical direction, and, in the 61st pixel in the vertical direction, a picture signal whose pixels are 1280×960 is allotted to pixels 321 through 1600 in the horizontal direction. Thus, picture signals (RGB signals) in a range surrounded by pixels (321, 61), (1600, 61), (321, 1020), and (1600, 1020) are read. Black color is allotted to the pixels other than the above. And, the RGB signals are converted to Y, Pr and Pb signals in the signal converter 44d, and the Y, Pr, Pb signals and synchronization signal are outputted to the HDTV display monitor and HDTV recorder. Thus, as shown in FIG. 5C, a high-definition television picture having an object picture, whose pixels are 1280×960, disposed in the center area, that is, a picture image (Format $D_4$) whose pixels 1920×1080i (interlace) are displayed in the HDTV display monitor.

Figure 6A:
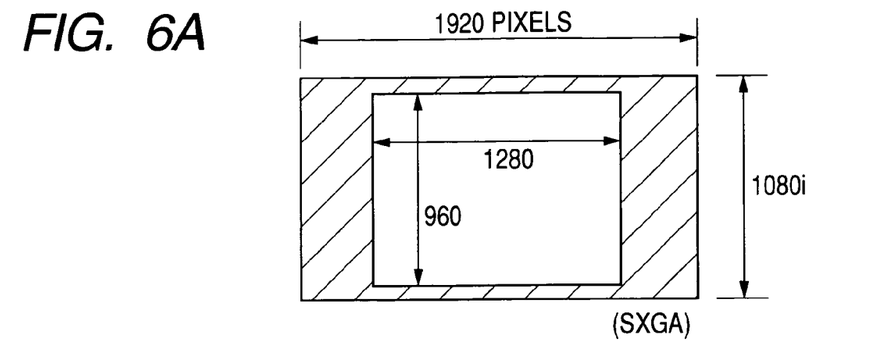
FIG. 6A is a descriptive view showing a display state of picture signals having pixels of 1280×960, which are formed by the high-definition system converter according to the embodiment.
Figure 6B:
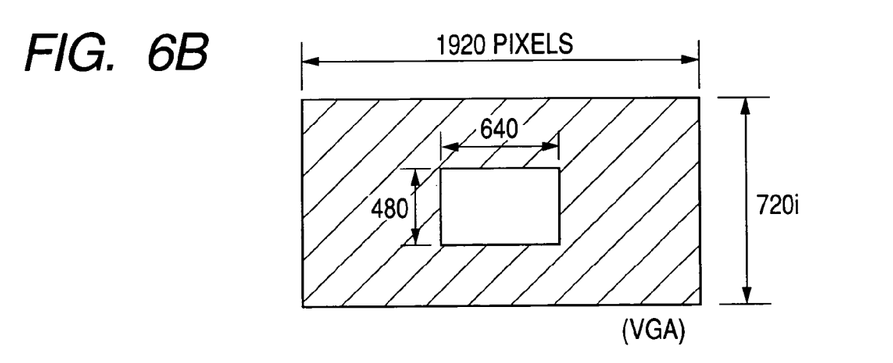
FIGS. 6B and 6C are descriptive views showing a display state of the VGA standard picture signals in the high-definition television display monitor.
Figure 6C:
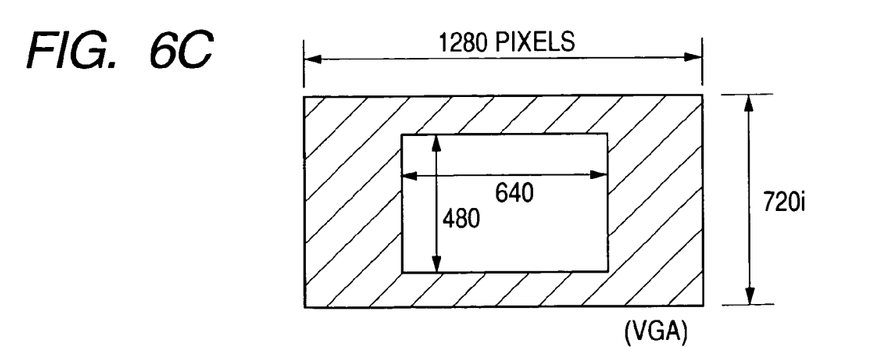

FIG. 6A shows a high-definition picture image in a case where a picture image having pixels of 1280×960 is detected. In this case, a high-definition television picture image in which a picture image of an object to be observed, having pixels of 1280×960, is disposed in the center area is displayed in the HDTV display monitor. Also, FIGS. 6B and 6C show a high-definition television picture image in a case where a VGA picture image having pixels of 640×480 is detected. In this case, as shown in FIG. 6B, a high-definition picture image in which a picture image of an object to be observed, having pixels of 640×480, is disposed may be displayed in the format $D_4$. However, since the picture image is made slightly smaller, the format $D_4$ is converted to the format $D_3$ by the memory controller 44c in the present embodiment, and as shown in FIG. 6C, a high-definition television picture image in the format $D_3$ having pixels of 1280×720i, in which a picture image of an object to be observed, having pixels of 640×480, is disposed in the center area is displayed.

Further, because the first embodiment is provided with an electronic enlarging circuit 47 as shown in FIG. 1, it is possible to display a picture image by enlarging the picture image to an easy-to-observe size (image size) by the electronic enlarging circuit 47. For example, the high-definition television system converter 37 itself is provided with a switch for optically setting the electronic magnification rate (or the electronic magnification rate may be optionally set by the processor unit or an external device), wherein the magnification rate of the electronic enlarging circuit 47 is controlled via the microcomputer 45. That is, picture signals having various types of pixel numbers, which are supplied to the HDTV signal converting portion 44 is supplied into the electronic enlarging circuit 47, and signals whose picture images are enlarged to a set magnification rate are formed on the basis of the picture signals, and the enlargement picture signals are returned to the HDTV signal converting portion 44. And, in the memory controller 44c of the HDTV signal converting portion 44, high-definition television signals are formed by reading out signals corresponding to the high-definition television system as described above after writing the above-described enlargement picture signals in the frame memory 46. As a result, a picture image of an object to be observed, which is enlarged by the set magnification rate, is displayed in the high-definition display monitor, wherein it is possible to facilitate observation of the object to be observed.

Further, it is possible to record the above-described pictures of the high-definition television system in the HDTV recorder connected to the connector 49. In the second embodiment, as video recording is operated for commencement and stop by using the video record/storing switch 14 in FIG. 11, the record controlling signal is converted to a serial signal by the microcomputer 24 at the processor unit 16 side, and is supplied to the microcomputer 45 at the high-definition television system converter 37 side via the transmission lines 100 and 101 (serial transmission cable 41). And, since the microcomputer 45 supplies a record controlling signal to the HDTV recorder via the transmission line 102 and control terminal 49m, high-definition television pictures are recorded and stored in the recorder.

Also, the above-described record controlling signal may be transmitted in a state where it is incorporated in a process of DVI picture signals, not by depending on the transmission line 101 (The second example of a record controlling signal transmission structure). That is, in a lookup table for a DVI process, there are remaining codes other than the standard in addition to reservation codes of default (standard setting) regarding the control signals for picture signals, and the remaining codes may be utilized. For example, in the case of 4 bits (actually, 8 bits, etc.), 16 codes may be prepared as in the following Table 1 (Lookup Table). Where it is assumed that ten codes among these are reservation codes of default, the other 6 codes may remain. Therefore, for example, as record controlling signals, recording commencement can be allotted to the 11th code, recording stop can be allotted to the 12th code, and recording pause can be allotted to the 13th code.

TABLE 1

| Code | Allotment |
|---|---|
| 1 | |
| 2 | |
| 3 | |
| 4 | Default (Control |
| 5 | signals of |
| 6 | picture signals) |
| 7 | |
| 8 | |
| 9 | |
| 10 | |
| 11 | Recording commencement |
| 12 | Recording stop |
| 13 | Recording pause |
| 14 | |
| 15 | |
| 16 | |

And, when the microcomputer 24 receives the above-described record controlling signals from the video recording/storing switch. 14, the parallel signal is output to the transmission portions 40A through 40C via the control lines $C_0$ through $C_3$ of the DVI circuit 28, wherein encoded serial record controlling signals of the 11th through 13th code are transmitted to the high-definition television system converter 37 via the serial transmission cable 41 in the transmission portions 40A through 40C. On the other hand, in the high-definition television system converter 37, control signals are decoded in the receiving portions 42A through 42C, and simultaneously are converted to parallel signals. Then, record controlling signals (Line 200) of the 11th through 13th codes are extracted in the rear stage ICA circuit 43, and are inputted into the microcomputer 45. After that, since the microcomputer 45 supplies the record controlling signals into the HDTV recorder via the control terminal 49m, recording of high-definition television pictures is commenced, and stop or pause thereof is controlled. According to the second example, it is not necessary to provide the transmission line 101, and it becomes possible to reduce the number of signal lines in the serial transmission cable 41.

Figure 7:
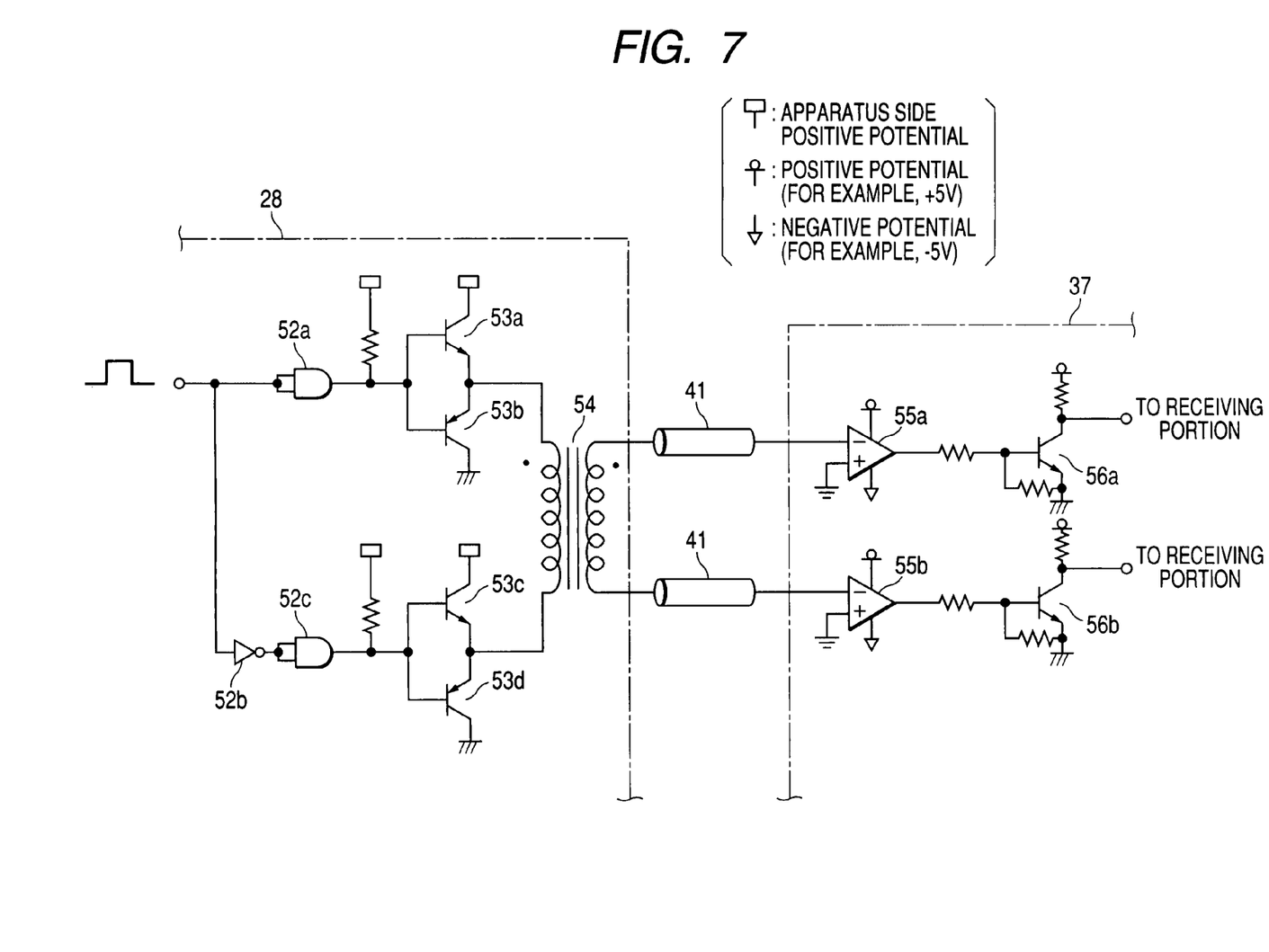
FIG. 7 is a circuit diagram showing a configuration in a case where a pulse transformer is employed as a differential circuit for connecting the DVI circuit and high-definition television system converter according to the embodiment to each other.
Figure 8:
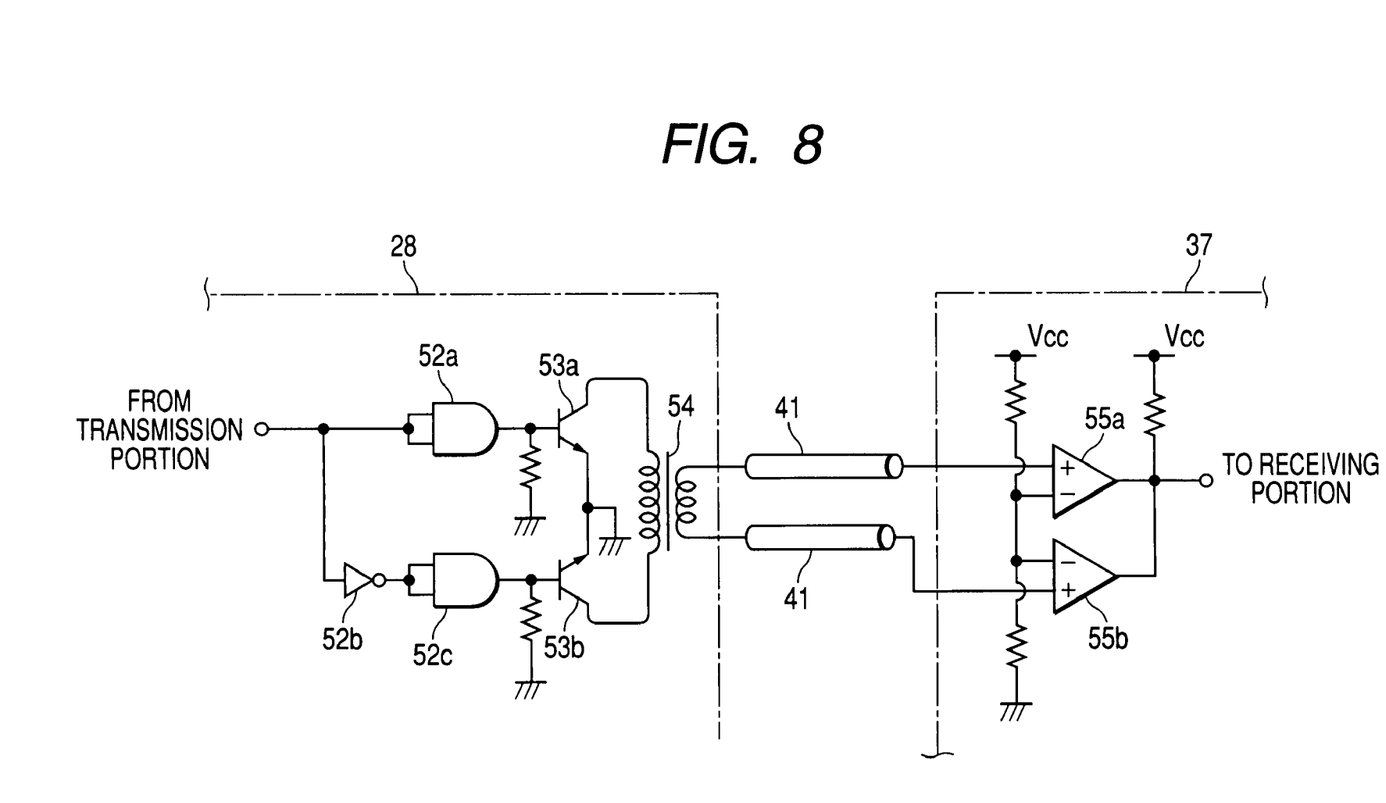
FIG. 8 is a circuit diagram showing a configuration in the case where a pulse transformer is employed as a differential circuit for connecting a DVI circuit of the embodiment and a high-definition television system converter to each other.
Figure 9:
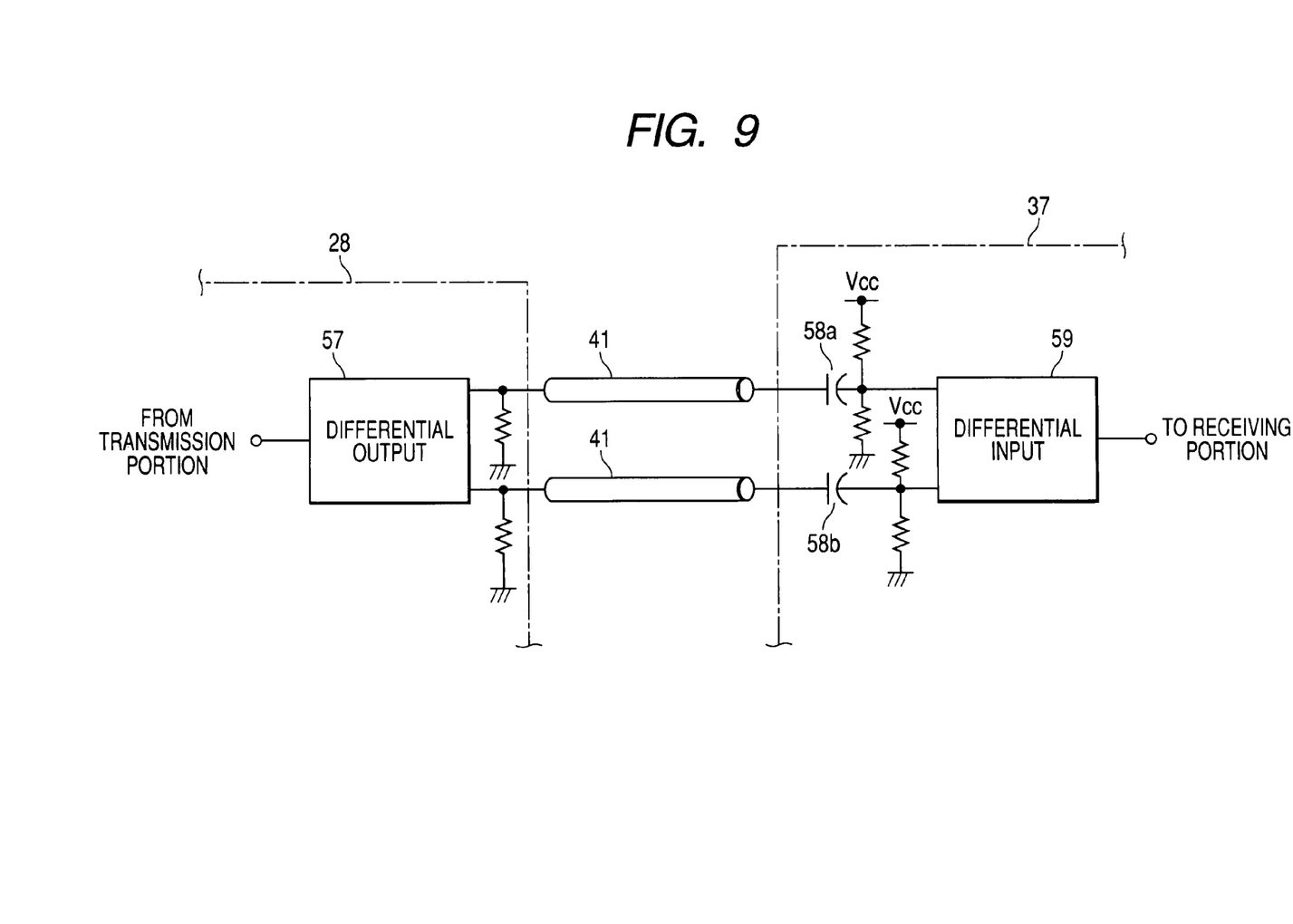
FIG. 9 is a circuit diagram showing a configuration in a case where a capacitor is employed as a differential circuit according to the embodiment.

FIG. 7 to FIG. 9 show a configuration of a differential circuit by which the above-described DVI circuit 28 and the high-definition system converter 37 are connected to each other. The configuration shown in FIG. 7 and FIG. 8 employs a pulse transformer. In this example, logic circuits 52a through 52c, transistors (53a through 53d in FIG. 7; and 53a and 53b in FIG. 8), for example, pulse transformers 54 which maintain a proof pressure of 4 kV or more, are provided as a differential driver in the DVI circuit 28 as illustrated, and comparators 55a and 55b, and transistors 56a and 56b (in FIG. 7), etc., are provided as a differential receiver in the high-definition system transformer 37. In addition, the configuration shown in FIG. 9 employs a capacitor. In this example, as illustrated, a differential output circuit 57, etc., is provided in the DVI circuit 28, and, for example, capacitors 58a and 58b which maintain a proof pressure of 4 kV or more, and a differential input circuit 59, etc., are provided in the high-definition system converter 37.

According to such a differential circuit, since the proof pressure of the pulse transformer 54, and capacitors 58a and 58b can be set to 4 kV or more which is required in an endoscope apparatus, there is no need to separately provide an isolation circuit, wherein it is possible to electrically isolate the DVI circuit 28 and the high-definition television system converter 37 from a commercial power source by utilizing a circuit for input and output of differential signals, and it becomes possible to easily secure safety of the electronic endoscope 10.

According to the high-definition television system converter of an electronic endoscope apparatus of the invention, even in a case where an electronic endoscope having different pixel numbers (resolution powers) of a CCD employed is connected by utilizing output of a differential signal outputting portion to supply a digital picture image to a personal computer, etc., a picture image of high-definition television system can be generated with a simple structure and at low costs without lowering the resolution power held by the CCD, and it is possible to output the picture image to a high-definition television system display monitor and recording unit. In addition, by making the high-definition television system converter into an adapter unit which meets the standards of EMC and electrical safety, which are required in medical fields, such an advantage can be brought about, by which observation of high-definition television picture images can be facilitated in the medical fields. Furthermore, by providing an electronic enlarging circuit, it becomes possible to cause picture images of an object to be observed of an easy-to-observe size to be displayed in a high-definition television display monitor. In addition, by serially transmitting a record controlling signal or incorporating a record controlling signal in encoding control for transmitting a control signal regarding picture signals in the differential signal outputting portion, the transmission structure of control signals into the recording unit can be simplified.

The entire disclosure of each and every foreign patent application from which the benefit of foreign priority has been claimed in the present application is incorporated herein by reference, as if fully set forth.

What is claimed is:

1. An electronic endoscope apparatus comprising: a processor unit; and an electronic endoscope selected from various types of electronic endoscopes having different pixel numbers of a solid-state pickup element which pick up an object, each of the various types of electronic endoscopes being capable of interchangeably connecting to the processor unit, so as to generate digital picture signals,
    wherein the processor unit comprises a differential signal outputting portion that generates digital picture signals corresponding to a pixel number of the solid-state pickup element of the selected one of the various types of electronic endoscopes and corresponding to a display standard for an external computer, parallel-serially converts the digital picture signals, and outputs the converted signals as differential signals,
    wherein the electronic endoscope apparatus further comprises a high-definition television system converter that detects the pixel number of the digital picture signals based on the differential signals inputted from the differential signal outputting portion, converts the digital picture signals to high-definition television signals based on the detected pixel number and outputs the high-definition television signals, the high-definition television system converter being detachably connected to the differential signal outputting portion, and
    wherein the differential signal outputting portion and high-definition television system converter are connected with a differential circuit comprising one of a pulse transformer and a capacitor to maintain a predetermined proof pressure.

2. The electronic endoscope apparatus according to claim 1, wherein the high-definition television system converter comprises an electronic enlarging circuit that electronically enlarges a picture image, so as to generate high-definition television signals of an optionally enlarged picture image.

3. An electronic endoscope apparatus comprising: a processor unit; and an electronic endoscope selected from various types of electronic endoscopes having different pixel numbers of a solid-state pickup element which pick up an object, each of the various types of electronic endoscopes being capable of interchangeably connecting to the processor unit, so as to generate digital picture signals,
    wherein the processor unit comprises a differential signal outputting portion that generates digital picture signals corresponding to a pixel number of the solid-state pickup element of the selected one of the various types of electronic endoscopes and corresponding to a display standard for an external computer, parallel-serially converts the digital picture signals, and outputs the converted signals as differential signals, and
    wherein the electronic endoscope apparatus further comprises a high-definition television system converter that detects the pixel number of the digital picture signals based on the differential signals inputted from the differential signal outputting portion, converts the digital picture signals to high-definition television signals based on the detected pixel number and outputs the high-definition television signals, the high-definition television system converter being detachably connected to the differential signal outputting portion,
    the apparatus further comprising:
    a record controlling signal transmission structure that parallel-serially converts record/control signals of the digital picture signals for the external recording unit, then serially transmit the record/control signals from the differential signal outputting portion to the high-definition television system converter, and output the record/control signals from a control terminal disposed in the high-definition television system converter.

4. The electronic endoscope apparatus according to claim 3,
    wherein, in the differential signal outputting portion, the record controlling signal transmission structure parallel-serially convert the record/control signals based on control of a microcomputer, encodes the record/control signals along with control signals pertaining to the digital picture signals, outputs the serial record/control signals as differential signals, and
    wherein, in the high-definition television system converter, the record controlling signal transmission structure decodes the record/control signals and serial-parallelly converts record/control signals.

5. The electronic endoscope apparatus according to claim 3, wherein the high-definition television system converter comprises an electronic enlarging circuit that electronically enlarges a picture image, so as to generate high-definition television signals of an optionally enlarged picture image.

* * * * *